(12) United States Patent
Ju

(10) Patent No.: US 6,262,417 B1
(45) Date of Patent: Jul. 17, 2001

(54) INFRARED BOLOMETER

(75) Inventor: Sang-Baek Ju, Seoul (KR)

(73) Assignee: Daewoo Electronics Co., Ltd., Seoul (KR)

( * ) Notice: Subject to any disclaimer, the term of this patent is extended or adjusted under 35 U.S.C. 154(b) by 0 days.

(21) Appl. No.: 09/222,698

(22) Filed: Dec. 29, 1998

(51) Int. Cl.⁷ .................................................. H01L 31/08
(52) U.S. Cl. .................... 250/338.1; 250/332; 250/338.4
(58) Field of Search ................................. 250/338.1, 332, 250/338.4

(56) References Cited

U.S. PATENT DOCUMENTS 5,367,167 * 11/1994 Keenan .............................. 250/338.4
6,094,127 * 7/2000 Yong .................................. 250/338.1

FOREIGN PATENT DOCUMENTS 354396   2/1990 (EP) .
111178   4/1998 (JP) .

OTHER PUBLICATIONS

International Search Report.

* cited by examiner

Primary Examiner—Constantine Hannaher
Assistant Examiner—Andrew Israel
(74) Attorney, Agent, or Firm—Pennie & Edmonds LLP

(57) ABSTRACT

An infrared bolometer having enhanced structural integrity includes an active matrix level having a substrate and a pair of connecting terminals, a support level provided with a pair of bridges and a pair of conduction lines, an absorption level including a bolometer clement surrounded by an absorber and a pair of posts positioned between the support level and the absorption level. Each of bridges is provided with an anchor portion, a leg portion and an elevated portion, the anchor portion being affixed to the active matrix level and the elevated portion being apart from the active matrix level, wherein the elevated portion of each of the bridges including an inner part cantilevered from an outer part. Each of the posts includes an electrical conduit, wherein each ends of the bolometer element is electrically connected to the respective connecting terminal through the respective conduit and the respective conduction line.

13 Claims, 5 Drawing Sheets

INFRARED BOLOMETER

FIELD OF THE INVENTION

The present invention relates to an infrared bolometer; and, more particularly, to the infrared bolometer capable of preventing a post therein from becoming tilted.

BACKGROUND OF THE INVENTION

A radiation detector is a device that produces an output signal which is a function of the amount of radiation that is incident upon an active region of the detector. Infra-red detectors are those detectors which are sensitive to radiation in the infra-red region of the electromagnetic spectrum. There are two types of infra-red detectors, thermal detectors including bolometers and photon detectors.

The photon detectors function based upon the number of photons that are incident upon and interact with electrons in a transducer region of the detector. The photon detectors, since they function based on direct interactions between electrons and photons, are highly sensitive and have a high response speed compared to the bolometers. However, they have a shortcoming in that the photon detectors operate well only at low temperatures, necessitating a need to an incorporate therein an additional cooling system.

The bolometers function, on the other hand, based upon a change in the temperature of the transducer region of the detector due to absorption of the radiation. The bolometers provide an output signal, i.e., a change in the resistance of materials (called bolometer elements), that is proportional to the temperature of the transducer region. The bolometer elements have been made from both metals and semiconductors. In metals, the resistance change is essentially due to variations in the carrier mobility, which typically decreases with temperature. Greater sensitivity can be obtained in high-resistivity semiconductor bolometer elements in which the free-carrier density is an exponential function of temperature.

In FIGS. 1 and 2, there are shown a perspective view and a cross sectional view illustrating a three-level bolometer 100, disclosed in U.S. application Ser. No. 09/102,364 entitled "BOLOMETER HAVING AN INCREASED FILL FACTOR". The bolometer 100 comprises an active matrix level 10, a support level 20, a pair of posts 40 and an absorption level 30.

The active matrix level 10 has a substrate 12 including an integrated circuit (not shown), a pair of connecting terminals 14 and a protective layer 16. Each of the connecting terminals 14 made of a metal is located on top of the substrate 12. The protective layer 16 made of, e.g., silicon nitride ($SiN_x$), covers the substrate 12. The pair of connecting terminals 14 are electrically connected to the integrated circuit.

The support level 20 includes a pair of bridges 22 made of silicon nitride ($SiN_x$), each of the bridges 22 having a conduction line 24 formed on top thereof. Each of the bridges 22 is provided with an anchor portion 22a, a leg portion 22b and an elevated portion 22c, the anchor portion 22a including a via hole 26 through which one end of the conduction line 24 is electrically connected to the connecting terminal 14, the leg portion 22b supporting the elevated portion 22c.

The absorption level 30 is provided with a bolometer element 32 surrounded by an absorber 31 and an IR absorber coating 33 formed on top of the absorber 31. The absorber 31 is fabricated by depositing silicon nitride before and after the formation of the bolometer element 32 to surround the bolometer element 32. Titanium (Ti) is chosen as the material for bolometer element 32 because of the ease with which it can be formed. Serpentine shape gives the bolometer element 32 to high resistivity.

Each of the posts 40 is placed between the absorption level 30 and the support level 20. Each of the posts 40 includes an electrical conduit 42 made of a metal, e.g., titanium (Ti), and surrounded by an insulating material 44 made of, e.g., silicon nitride ($SiN_x$) Top end of the electrical conduit 42 is electrically connected to one end of the serpentine bolometer element 32 and bottom end of the electrical conduit 42 is electrically connected to the conduction line 24 on the bridge 22, in such a way that each ends of the serpentine bolometer element 32 in the absorption level 30 is electrically connected to the integrated circuit of the active matrix level 10 through the electrical conduits 42, the conduction lines 24 and the connecting terminals 14.

When exposed to infra-red radiation, the resistivity of the serpentine bolometer element 32 increases, causing a current and a voltage to vary, accordingly. The varied current or voltage is amplified by the integrated circuit, in such a way that the amplified current or voltage is read out by a detective circuit (not shown).

In the above-described infrared bolometer, in order to decrease the thermal exchange between the active matrix level and the absorption level, the support level is as long as possible, and this is achieved by cantilevering the support level on the active matrix level. This solution, however, has a drawback in that the elevated portion of the bridge gets warped easily and bent upward to relieve the elastic stress accumulated in the bridge during the formation thereof, which will, in turn, bend the absorber, resulting in decreasing the absorbing efficiency of the bolometer.

SUMMARY OF THE INVENTION

It is, therefore, a primary object of the present invention to provide an infrared bolometer capable of preventing a post therein from being tilted.

In accordance with one aspect of the present invention, there is provided the infra-red bolometer, which comprises: an active matrix level including a substrate and a pair of connecting terminals; a support level provided with a pair of bridges and a pair of conduction lines, whereby each of the bridges is provided with an anchor portion, a leg portion and an elevated portion, the anchor portion being affixed to the active matrix level and the elevated portion being apart from the active matrix level, wherein the elevated portion of each of the bridges includes an inner part cantilevered from an outer part; an absorption level including a bolometer element surrounded by an absorber; and a pair of posts positioned on top of the inner part of the bridge, each of the posts including an electrical conduit, wherein each ends of the bolometer element is electrically connected to the respective connecting terminal through the respective conduit and the respective conduction line.

BRIEF DESCRIPTION OF THE DRAWINGS

The above and other objects and features of the present invention will become apparent from the following description of the preferred embodiments given in conjunction with the accompanying drawings, wherein.

DETAILED DESCRIPTION OF THE PREFERRED EMBODIMENTS

Figure 1:
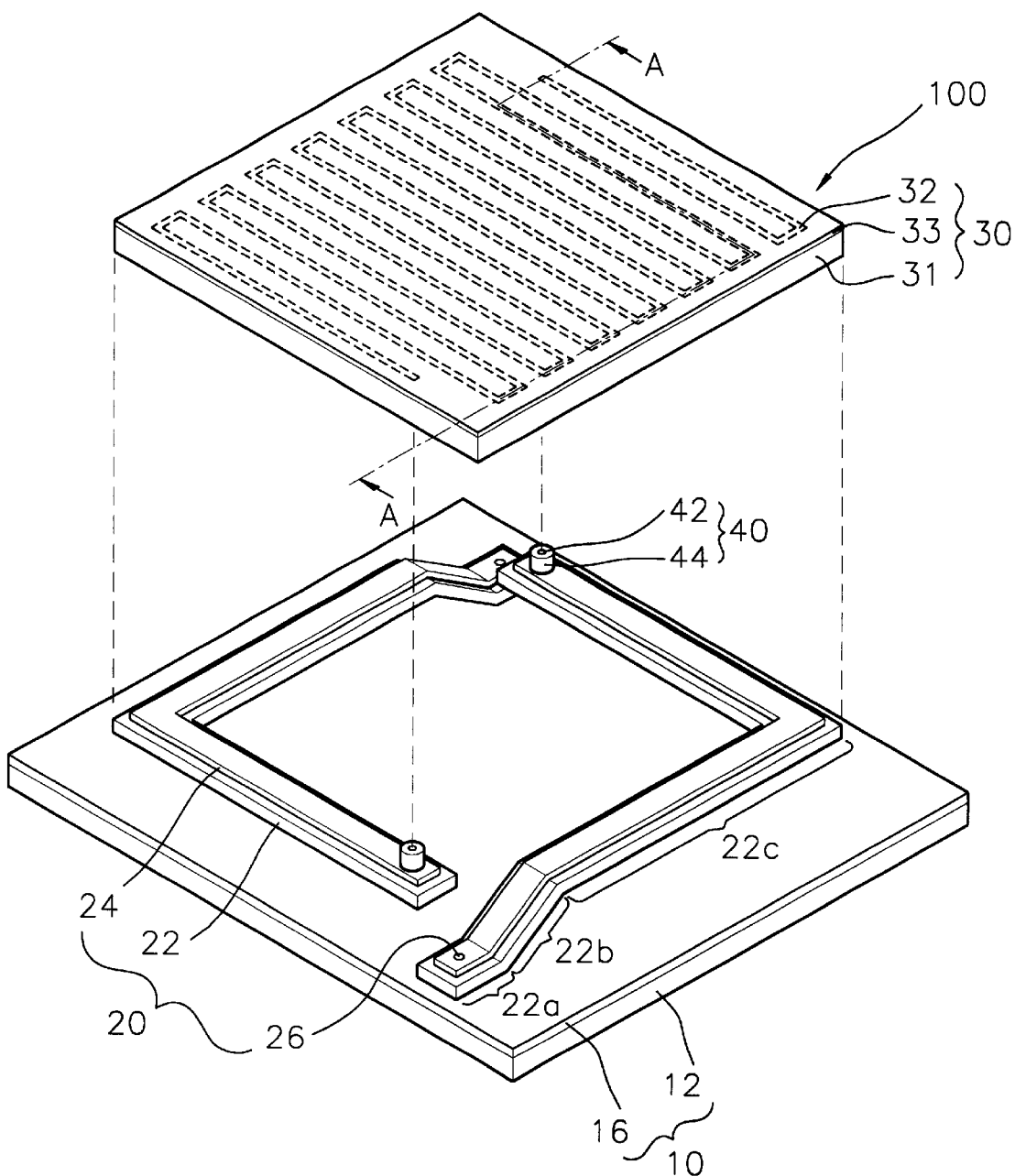
FIG. 1 shows a perspective view setting forth an infrared bolometer previous disclosed.
Figure 2:
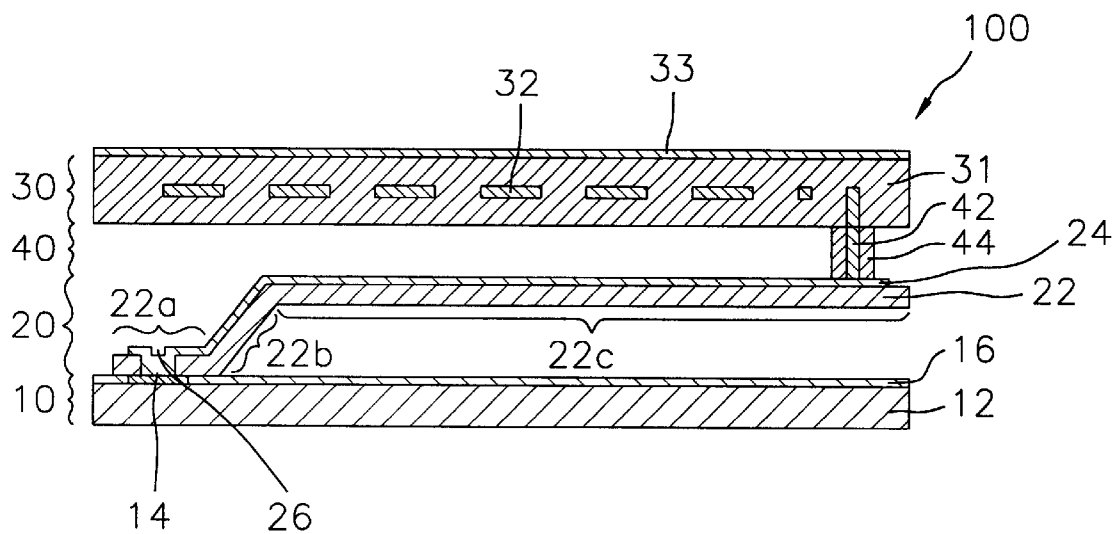
FIG. 2 presents a schematic cross sectional view depicting the infrared bolometer taken along A—A in FIG. 1.
Figure 3:
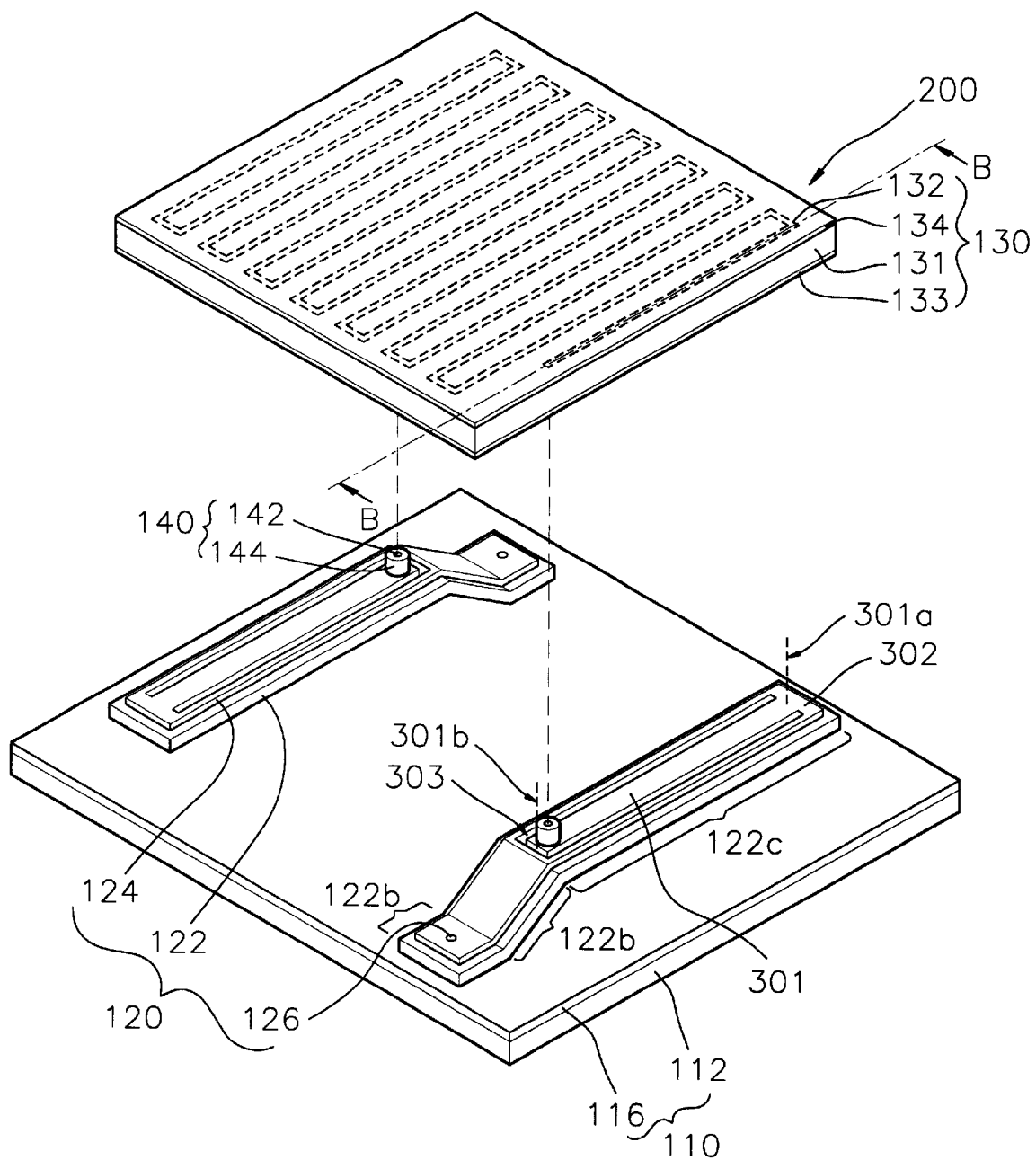
FIG. 3 shows a perspective view illustrating an infrared bolometer in accordance with the present invention.
Figure 4:
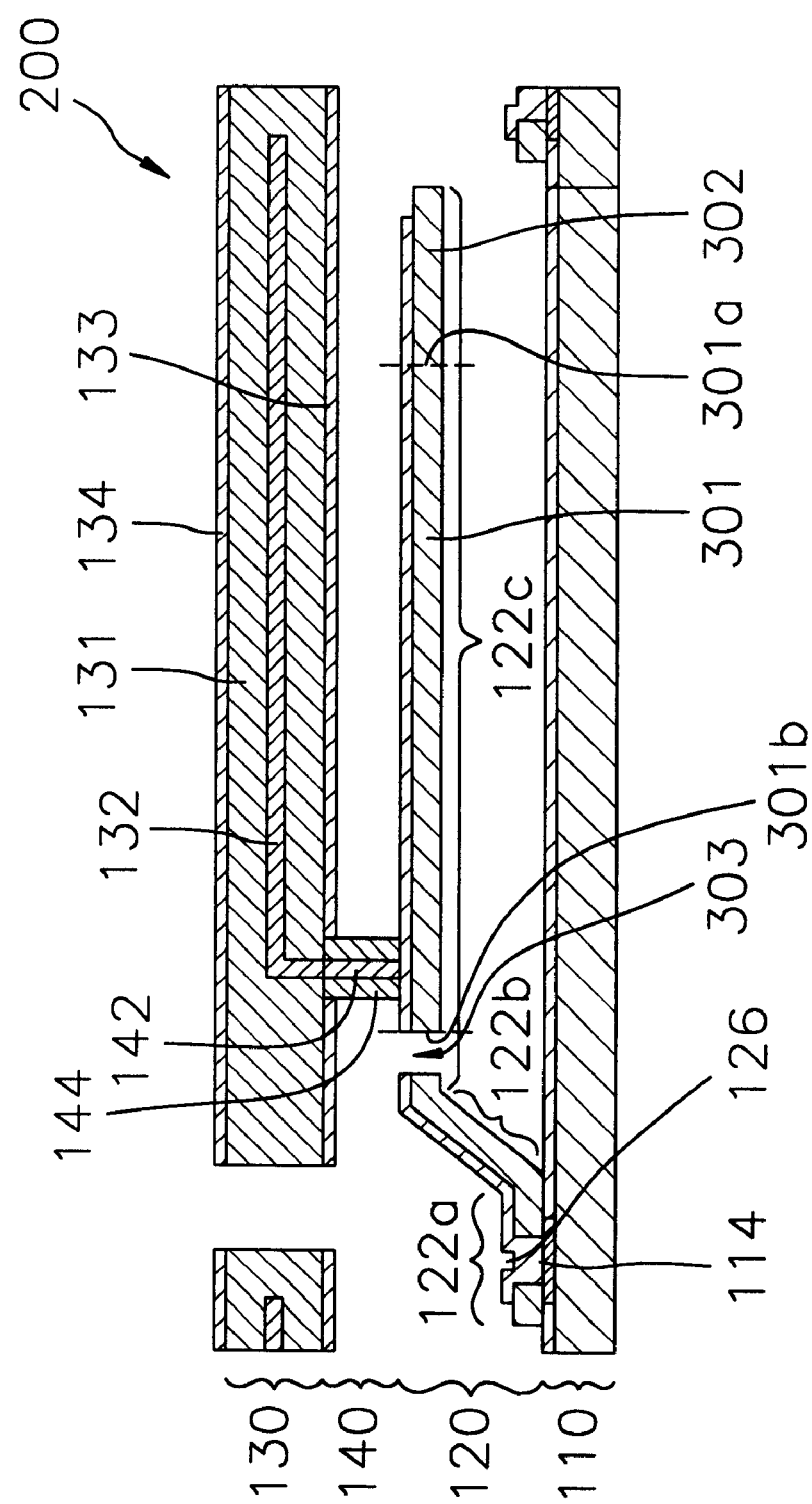
FIG. 4 provides a schematic cross sectional view setting forth the infrared bolometer taken along B—B in FIG. 3.
Figure 5:
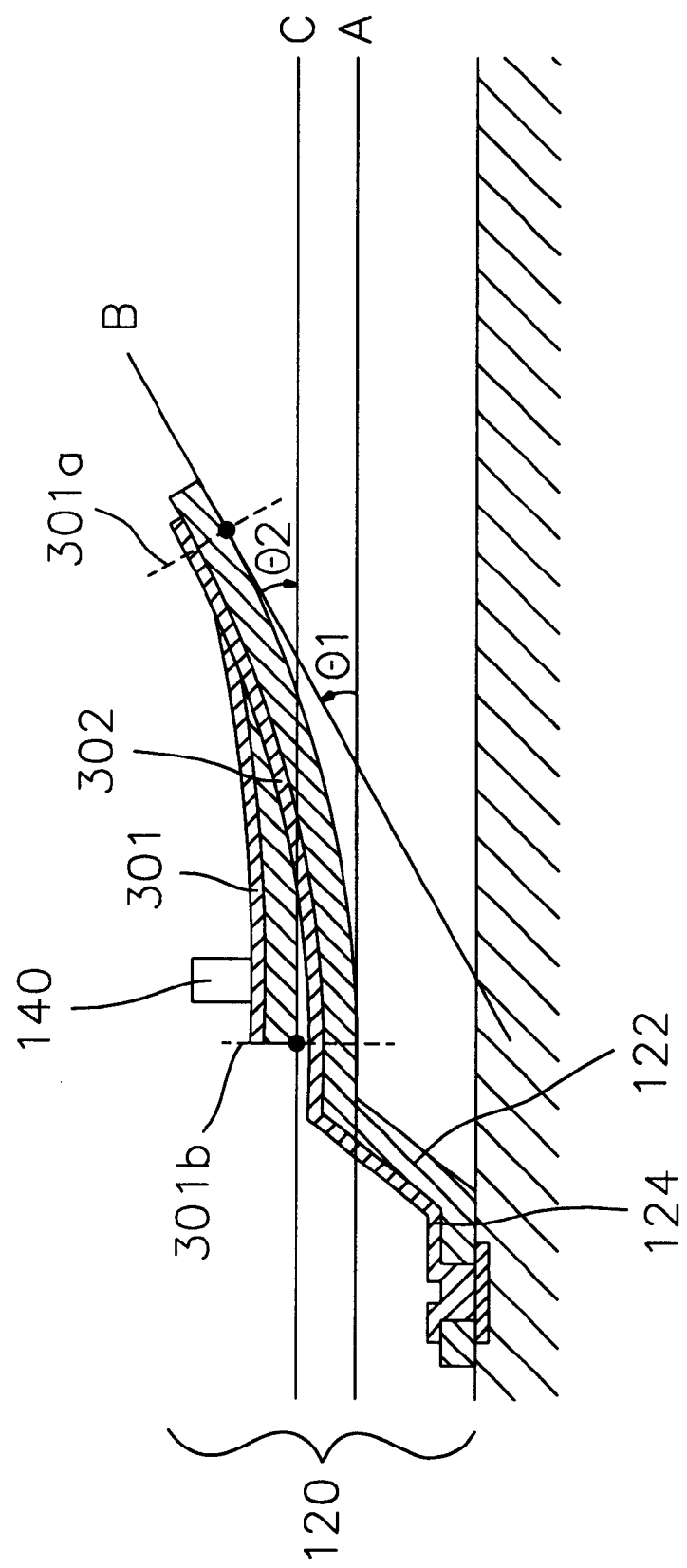
FIG. 5 presents a schematic cross sectional view illustrating an warped bridge of the infrared bolometer.

There are provided in FIGS. 3, 4 and 5 a perspective view setting forth an infrared bolometer 200, a schematic cross sectional view illustrating the infrared bolometer 200, a schematic cross sectional view depicting an warped bridge of the infrared bolometer 200, in accordance with the present invention, respectively. It should be noted that like parts appearing in FIGS. 3, 4 and 5 are represented by like reference numerals.

The inventive bolometer 200 shown in FIGS. 3 and 4 comprises an active matrix level 110, a support level 120, a pair of posts 140 and an absorption level 130.

The active matrix level 110 has a substrate 112 including an integrated circuit (not shown), a pair of connecting terminals 114 and a protective layer 116. Each of the connecting terminals 114 made of a metal is located on top of the substrate 112 and is electrically connected to the integrated circuit. The protective layer 116 made of, e.g., silicon nitride ($SiN_x$), covers the substrate 112 to prevent the connecting terminals 114 and the integrated circuit from damaging chemically and physically during the manufacturing of the infrared bolometer 200.

The support level 120 includes a pair of bridges 122 made of an insulating material, e.g., silicon nitride ($SiN_x$), silicon oxide ($SiO_2$) or silicon oxy-nitride ($SiO_xN_y$), and a pair of conduction lines 124 made of a metal, e.g., titanium (Ti), wherein each of the conduction lines 124 is placed on top of the respective bridge 122. Each of the bridges 122 is provided with an anchor portion 122a, a leg portion 122b and an elevated portion 122c. The anchor portion 122a includes a via hole 126 through which one end of each of the conduction lines 124 is electrically connected to the respective connecting terminal 114. The leg portion 122b located between the anchor portion 122a and the elevated portion 122c supports the elevated portion 122c. The elevated portion 122c is provided with an inner part 301 and an outer part 302, wherein one side 301a of the inner part 301 is connected to the outer part 302 and other sides 301b of the inner part 301 are separated from the outer part 302 by an gap 303, thereby cantilevering the inner part 301 from the outer part 302.

The absorption level 130 is provided with a bolometer element 132 surrounded by an absorber 131, an reflective layer 133 formed at bottom of the absorber 131 and an IR absorber coating 134 positioned on top of the absorber 131. The absorber 131 made of an insulating material having an low heat-conductivity, e.g., silicon nitride ($SiN_x$), silicon oxide ($SiO_x$) or silicon oxy-nitride ($SiO_xN_y$) is fabricated by depositing the insulating material before and after the formation of the bolometer element 132 to surround the bolometer element 132. The bolometer element 132 is made of metal, e.g., titanium, and has a serpentine shape. The reflective layer 133 is made of a metal, e.g., Al or Pt, and is used for returning the transmitted IR back to the absorber 131. The IR absorber coating 134 is made of, e.g., black gold, and is used for reinforcing an absorption efficiency for the incident IR.

Each of the posts 140 is placed on top of the inner part 301 of the bridge 122 in the support level 120 and on bottom of the absorber 131 of the absorption level 130. Each of the posts 140 includes an electrical conduit 142 made of a metal, e.g., titanium (Ti), and surrounded by an insulating material 144 made of, e.g., silicon nitride ($SiN_x$), silicon oxide ($SiO_x$) or silicon oxy-nitride ($SiO_xN_y$). Top end of each of the electrical conduits 142 is electrically connected to one end of the bolometer element 132 and bottom end of the electrical conduit 142 is electrically connected to the conduction line 124 on the bridge 122, in such a way that each ends of the bolometer element 132 in the absorption level 130 is electrically connected to the integrated circuit of the active matrix level 110 through the respective electrical conduits 142, the respective conduction lines 124 and the respective connecting terminals 114.

When exposed to infrared radiation, the resistivity of the bolometer element 132 changes, causing a current and a voltage to vary, accordingly. The varied current or voltage is amplified by the integrated circuit, in such a way that the amplified current or voltage is read out by detective circuit (not shown).

FIG. 5 provides a schematic cross sectional view illustrating a bridge 122 of the infrared bolometer 200, wherein the elastic stress accumulated in the bridge 122 is relieved by the bridge becoming bent. The inner part 301 and the outer part 302 get bent to relieve the stress. One tangent line B of the curvature at the connecting side 301a of the inner part 301 forms a first angle ($\theta 1$) with respect to a horizontal line A, wherein the first angle ($\theta 1$) functions as an initial angle of the inner part 301. Another tangent line C of the curvature at the separated side 301b of the inner part 301, opposite to the connecting side 301a, forms a second angle ($-\theta 2$) with respect to the tangent line B. As the post 140 is positioned on top of the separated side 301b of the inner part 301, the slop angle ($\theta 3$) of the post 140 is a sum of the first angle ($\theta 1$) and the second angle ($-\theta 2$).

However, since the length of the inner portion 301 is approximately same as that of the outer portion 302, the slop angle ($\theta 3$) of the post 140 becomes close to zero, thereby, structurally preventing the post 140 from tilting, which will, in turn, prevent the absorber 131 from becoming bent.

While the present invention has been described with respect to certain preferred embodiments only, other modifications and variations may be made without departing from the scope of the present invention as set forth in the following claims.

What is claimed is:

1. An infrared bolometer comprising:

an active matrix level including a substrate and a pair of connecting terminals;

a support level provided with a pair of bridges and a pair of conduction lines, whereby each of the bridges is provided with an anchor portion, a leg portion and an elevated portion, the anchor portion being affixed to the active matrix level and the elevated portion being apart from the active matrix level, wherein the elevated portion of each of the bridges includes an inner part and an outer part, the inner part being cantilevered from the outer part;

an absorption level including a bolometer element surrounded by an absorber; and a pair of posts positioned on top of the inner part of the bridge, each of the posts including an electrical conduit, wherein each ends of the bolometer element is electrically connected to the respecting connecting terminal through the respective conduit and the respective conduction line.

2. The bolometer of claim 1, wherein one side of the inner part in each of the bridges is connected to the outer part thereof.

3. The bolometer of claim 2, wherein other sides of the inner part in each of the bridges are separated from the outer part thereof by a gap.

4. The bolometer of claim 1, wherein the absorption level further includes a reflective layer formed at bottom of the absorber.

5. The bolometer of claim 4, wherein the absorption level further includes an IR absorber coating formed on top of the absorber.

6. In an infrared bolometer comprising:

an active matrix level including a substrate and a pair of connecting terminals;

an absorption level including a bolometer element surrounded by an absorber; and a support level connecting the absorption level to the active matrix level, the support level comprising a pair of bridges, each bridge having an anchor portion, a leg portion and an elevated portion, the anchor portion being affixed to the active matrix level, and the elevated portion being spaced apart from the active matrix level and being connected to the absorption level, the improvement wherein:

the elevated portion of each bridge includes a first part and a second part, the first part being connected to the absorption level and being cantilevered from the outer part such that a portion of the first part is displaced relative to a portion of the second part, when the bridge is bent.

7. The infrared bolometer according to claim 6, wherein the first part is connected at a first end thereof to the second part.

8. The infrared bolometer according to claim 7, wherein the second part substantially surrounds the first part.

9. The infrared bolometer according to claim 8, wherein portions of the first and second parts are separated by a gap.

10. The infrared bolometer according to claim 6, wherein the first part is connected to the absorber via a post which includes an electrical conduit connecting the bolometer element to the active matrix.

11. The infrared bolometer according to claim 10, wherein the first part is connected at a first end thereof to the second part.

12. The infrared bolometer according to claim 11, wherein the second part substantially surrounds the first part.

13. The infrared bolometer according to claim 12, wherein portions of the first and second parts are separated by a gap.

* * * * *